United States Patent [19]

Asper

[11] 4,050,176

[45] Sept. 27, 1977

[54] FLY TIE TOOL

[75] Inventor: William Asper, Englewood, Colo.

[73] Assignee: The Raymond Lee Organization, Inc., New York, N.Y.

[21] Appl. No.: 696,120

[22] Filed: June 14, 1976

[51] Int. Cl.² .............................................. A01K 91/04
[52] U.S. Cl. ........................................ 43/1; 24/259 R
[58] Field of Search ...................... 43/1, 4, 44.6, 44.8; 24/259 PF, 259 GC, 259 C, DIG. 9, 129 B, 255 TV, 259 R, 259 D; 30/28; 7/1 H

[56] References Cited

U.S. PATENT DOCUMENTS

| 1,807,100 | 5/1931 | Graff et al. | 24/259 PF |
|---|---|---|---|
| 3,447,173 | 6/1969 | Kleiman | 30/28 |
| 3,754,290 | 8/1973 | Nicholson | 7/1 H |
| 3,825,961 | 7/1974 | Klein | 7/1 H |

FOREIGN PATENT DOCUMENTS 80,280  3/1895  Germany .......................... 24/259 PF Primary Examiner—Warner H. Camp
Attorney, Agent, or Firm—Howard I. Podell

[57] ABSTRACT

The tool is in the form of a clip shaped of a single bent length of sheet spring material having a first leg of flat shape joined by a U-section to a second leg. The free end of the second leg is bent as a right angle flange with the end of the flange bearing against the first leg to serve as a clamp jaw against a fishing line held between the flange and the first leg. The mid-section of the second leg between the jaw and the U-section is formed as a V-section with the tip of the V-section resting on the first leg and serving as a fulcrum. Squeezing pressure on the section of the second leg between the U-section and the V-section applied towards the first leg causes the flange to move away from the first leg to free a line clamped between the first leg and the flange.

2 Claims, 6 Drawing Figures

U.S. Patent    Sept. 27, 1977    4,050,176
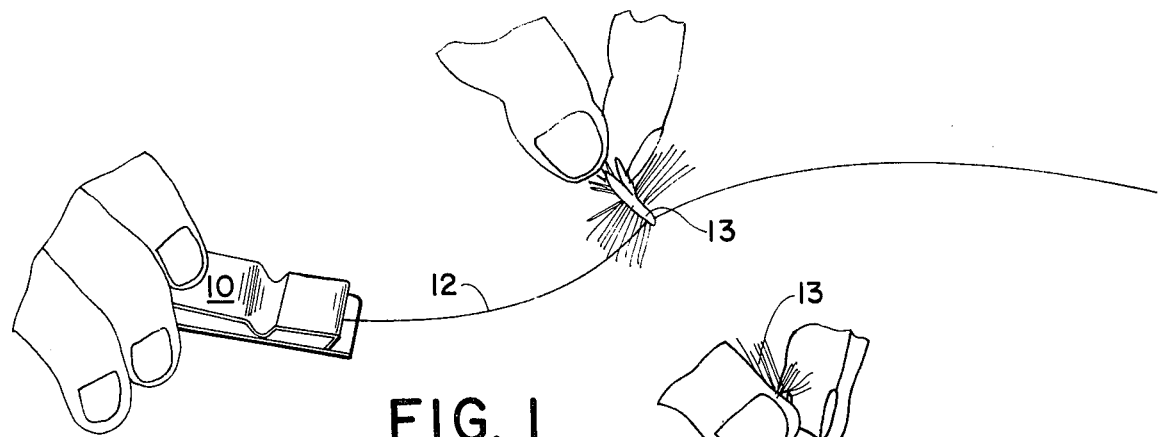
FIG. 1
FIG. 2
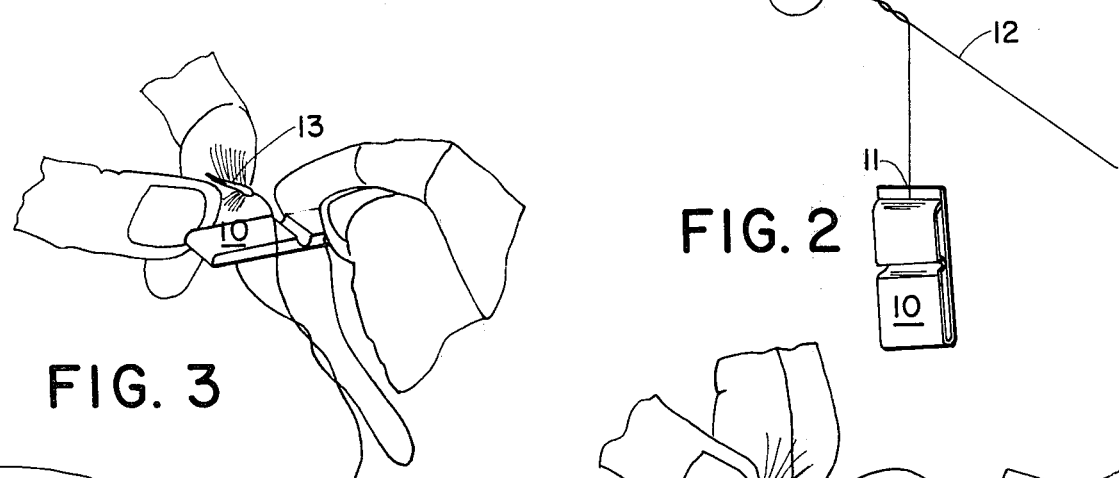
FIG. 3
FIG. 4
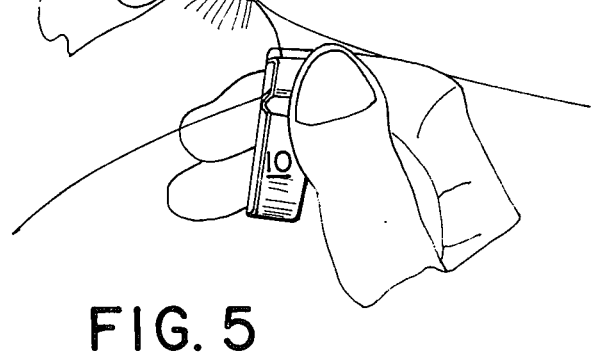
FIG. 5
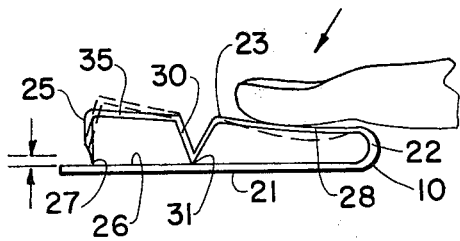
FIG. 6

FLY TIE TOOL

SUMMARY OF THE INVENTION

My invention is a clip for attachment to the end of a length of monofilament which is to be fastened as the leader of a fishing line fly. The tool is in the form of a clip shaped of a single bent length of sheet spring material. The clip is formed of a first leg of flat shape joined by a U-section to a second leg. The free end of the second leg is bent as a right angle flange with the end of the flange bearing against the first leg to serve as a clamp jaw against a fishing line held between the flange and the first leg. The mid-section of the second leg between the jaw and the U-section is formed as a V-section with the tip of the V-section resting on the first leg and serving as a fulcrum. Squeezing pressure on the section of the second leg between the U-section and the V-section applied towards the first leg causes the flange to move away from the first leg to free a line clamped between the first leg and the flange.

By means of my invention, an end of a monofilament line may be readily clamped by the clip and the clip used as a weighted leader to wind the clamped line about itself and to tie the clamped line to a fly.

BRIEF DESCRIPTION OF THE DRAWINGS

The objects and features of the invention may be understood with reference to the following detailed description of an illustrative embodiment of the invention, taken together with the accompanying drawings in which:

FIGS. 1-5 are perspective views of the invention in use in tying a fly leader; and FIG. 6 is a side view of the invention

DESCRIPTION OF THE PREFERRED EMBODIMENT

Turning now descriptively to the drawings, in which similar reference characters denote similar elements throughout the several views, FIGS. 1-6 illustrate the tie clip 10 which is readily clamped to an end 11 of a length of monofilament 12 to tie it about a fly 13.

As shown in FIG. 6, the clip is formed of a continuous sheet of spring material with a straight length forming a first leg 21 joined to a U-shaped section 22 which is joined to a second leg 23. The free end of second leg 23 is bent at right angles to form a flange 25 that bears against the inside flat surface 26 of the first leg 21 to serve as a clamp jaw for retention of a length of line 12 between the edge 27 of flange 25 and the flat surface 26 of leg 21. The mid-section of leg 23 is bent as a V-section 30, with the tip 31 of V-section 30 bearing against flat surface 26 of first leg 21 to serve as a fulcrum, when the inner section 28, between V-section 30 and U-section 22 of second leg 23 is manually depressed toward first leg 21, with the bending of section 28 causing flange edge 27 to lift away from contact with first leg surface 26 so as to open the clamp jaw.

With flange edge 27 clamping an end 11 of a line 12 to leg 21, the clip becomes a weighted leader, as shown in FIGS. 1-5, for winding a line 12. that passes through a fly 13, about itself and through loops to form a tight knot in the line about the fly. Flange edge 27 may be made as a knife edge so that manual pressure against outer leg section 35 of a second leg 23 serves, as shown in FIG. 5, to cut the excess line length.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A clip which may be fastened to a line
said clip formed of a spring material of two flat legs joined together by a U-section, with an end of a first leg bent as a flange, said flange extending generally perpendicularly to the plane of the first leg towards the second leg, with the edge of said flange normally maintained in contact with said second leg, with the two legs of said clip shaped to apply spring bias serving to normally hold said flange edge in contact with the second leg, in which
the first leg is formed with a V-section located at substantially the mid-section of said first leg between the flange and the U-section, said V-section oriented so that the tip of the V-section normally bears against the said second leg, such that manually compressing the section of the first leg lying between the U-section and the V-section towards the second leg serves to lift the flange edge completely from contact with said second leg.

2. The combination as recited in claim 1 in which the edge of the flange is formed as a knife edge so that it cuts a clamped line held between the flange edge and the second leg when manual pressure is applied between the flange end of the first leg and the second leg.

* * * * *